(12) United States Patent
Shirai et al.

(10) Patent No.: US 7,059,193 B2
(45) Date of Patent: Jun. 13, 2006

(54) PRESSURE SENSOR WITH A DIAPHRAGM WHICH HAS PLURAL INTERMITTENT RING-SHAPED REINFORCING RIBS BY GROOVES

(75) Inventors: Susumu Shirai, Suzaka (JP); Katsumi Maki, Suzaka (JP)

(73) Assignee: Techno Excel Kabushiki Kaisha, Suzaka (JP)

( * ) Notice: Subject to any disclaimer, the term of this patent is extended or adjusted under 35 U.S.C. 154(b) by 0 days.

(21) Appl. No.: 10/753,685

(22) Filed: Jan. 7, 2004

(65) Prior Publication Data

US 2005/0000291 A1    Jan. 6, 2005

(30) Foreign Application Priority Data

Jul. 2, 2003    (JP) .............................. 2003-270240

(51) Int. Cl.
*G01L 7/08* (2006.01)

(52) U.S. Cl. ........................................................ 73/715

(58) Field of Classification Search ........... 73/700–756
See application file for complete search history.

(56) References Cited

FOREIGN PATENT DOCUMENTS

| JP | S52-47094 | 10/1977 |
|---|---|---|
| JP | H11-23394 | 1/1999 |
| JP | H13-170393 | 6/2001 |

*Primary Examiner*—Edward Lefkowitz
*Assistant Examiner*—Jermaine Jenkins
(74) *Attorney, Agent, or Firm*—Kazuyuki Nieda

(57) ABSTRACT

To improve the characteristics of a portion which can be represented by an approximate first-order line (so-called linearity) in the relation between pressure and diaphragm displacement. To equalize the pressure-applying area/volume of a diaphragm when plural ring-shaped reinforcement ribs are in contact with said cover (no load condition when no pressure is applied to the diaphragm) and the pressure-applying area/volume of a diaphragm when said diaphragm is apart from said cover (the diaphragm is displaced due to pressure load).

1 Claim, 3 Drawing Sheets

PRESSURE SENSOR WITH A DIAPHRAGM WHICH HAS PLURAL INTERMITTENT RING-SHAPED REINFORCING RIBS BY GROOVES

FIELD OF INVENTION

This invention mainly relates to a pressure sensor that is mounted on a printed circuit board used for washing machines, bathtub units, air conditioners, dishwashers, etc. More particularly, for a diaphragm that converts pressure into displacement, this invention relates to the improvement of the characteristics of the portion which can be represented by an approximate first-order line (so called "linearity") in the relation between pressure and diaphragm displacement.

BACKGROUND ART

A pressure sensor designed to be mounted on a printed circuit board is known to be comprising:

a body, wherein tab terminals for connector connection are insert-molded, or wherein coil terminals-cum-soldering fixed terminals which are inserted into a printed circuit board are insert-molded;

a coil spring adjusting screw which is screwed into said body;

a coil which is wound around said body;

a magnetic body which moves relative to said coil;

a diaphragm which has a support for said magnetic body projected approximately at the center on one side and has plural ring-shaped reinforcing ribs on the other side;

a coil spring which restores said diaphragm;

a cover with pressure inlet pipe.

It is disclosed in Japan's Published Unexamined Patent Application No. 23394/99, from page 4 to 5, FIG. 2.

Also, it is public known technology to form small bosses on said cover so that said cover with pressure inlet pipe and the ring-shaped reinforcing ribs formed on the diaphragm are not adhered to each other. It is disclosed in Japan's Utility Model Gazette No. 47094/77, from page 1 to 2, FIG. 2.

However, although it is possible to form small bosses if said cover has a large diameter, it is almost impossible to form the bosses on said cover with a small diameter. So, it is common that no bosses are formed on said cover with a small diameter.

Recently, material forming a diaphragm is shifting from EPDM (ethylene-propylene rubber) to silicone rubber. It is disclosed in Japan's Unexamined Patent Application No. 170393/01.

This is because of an advantage that silicone mostly meets requirements for a diaphragm (temperature characteristics) and that it has little problem of adherence to said cover.

DETAILED DESCRIPTION OF THE INVENTION

Problems to be Solved by the Invention

There is a description in Japan's Published Unexamined Patent Application No. 23394/99, from the 38$^{th}$ line of page 4, item 6 to the second line of page 5, item 7 that " . . . also, the retaining part 14c is thickly formed to improve the total rigidity, and it is possible to further improve the rigidity of the retaining part 14c by providing reinforcing ribs 14d on a pressure-applying surface of the retaining part 14c. By thus improving the rigidity of the retaining part 14c, it becomes possible to prevent the diaphragm 14 from degrading its planarity by deformation of the retaining part 14c as the diaphragm displaces, to move the core 16 linearly along the direction of the axis line of the diaphragm 14, and to prevent the core 16 from leaning during the movement. Because of these, accurate displacement measurement becomes possible, which consequently enables accurate pressure measurement. Figuration of the reinforcement ribs 14d may be formed concentrically centering on the center of the retaining part 14c as shown in FIG. 2, or may be formed in radial. Or the figuration may be the one that combines the both." But because the material forming the diaphragm is shifting from EPDM to silicone, and comparing the rigidity or formability of the figuration of the reinforcement ribs, the plural ring-shaped reinforcing ribs practically surpass the plural radial reinforcing ribs.

However, as there is a difference between the pressure-applying area/volume of a diaphragm when plural ring-shaped reinforcing ribs are in contact with said cover (no load condition when no pressure is applied to the diaphragm) and the pressure-applying area/volume of a diaphragm when said diaphragm is apart from said cover (diaphragm is displaced due to pressure load), the problem is that there is a certain (unstable) range which has poor relativity in the relation between pressure and diaphragm displacement by pressure load.

Means for Solving the Problems

This invention was made in view of these problems that the current technology has, and its objective is to offer a pressure sensor, wherein the characteristics of the pressure and the diaphragm displacement which can be represented by an approximate first-order line (so called linearity) is improved.

In order to achieve the above mentioned objective, the pressure sensor of this invention comprises:

a body, wherein tab terminals for connector connection are insert-molded, or wherein coil terminals-cum-soldering fixed terminals which are inserted into a printed circuit board are insert-molded;

a coil spring adjusting screw which is screwed into said body;

a coil which is wound around said body;

a magnetic body which moves relative to said coil; a diaphragm which has a support for said magnetic body projected approximately at the center on one side and has plural ring-shaped reinforcing ribs on the other side;

a coil spring which restores said diaphragm;

a cover with pressure inlet pipe, and with characteristics that said reinforcing ribs are intermittent ring-shaped.

Effects of the Invention

By forming plural reinforcing ribs into intermittent ring-shaped, the pressure-applying area/volume of a diaphragm when plural ring-shaped reinforcing ribs are in contact with said cover (no load condition when no pressure is applied to the diaphragm) and the pressure-applying area/volume of a diaphragm when said diaphragm is apart from said cover (diaphragm is displaced due to pressure load) become equal, which takes an effect that there is no unstable range (non-linear portion) in the relation between pressure and diaphragm displacement due to pressure load.

Best Form to Implement the Invention

The objective to eliminate the unstable range (non-linear portion) in the relation between pressure and diaphragm displacement has been achieved without impairing the rigidity of plural ring-shaped reinforcing ribs on a diaphragm or formability of the figure of the reinforcement ribs.

PRACTICAL EXAMPLE

FIG. 1 is a cross-section drawing (miniature) of a pressure sensor 10. FIG. 2 is a plain view (a) and cross-section drawing (b) of an existing diaphragm 23. FIG. 3 is a plain view (a) and cross-section drawing (b) of a diaphragm 26 of this invention.

The pressure sensor 10 basically adopts the existing composition without change and comprises:

a body 11, wherein tab terminals for connector connection are insert-molded, or wherein coil terminals-cum-soldering fixed terminals 12 which are inserted into a printed circuit board is insert-molded;

a coil spring adjusting screw 20 which is screwed into said body 11;

a coil 13 which is wound around said body 11;

a magnetic body 22 which moves relative to said coil 13, a diaphragm 26 (23 in case of existing diaphragm) which has a support 27 for said magnetic body projected approximately at the center on one side and has plural (two) ring-shaped reinforcing ribs 28 (boss) on the other side, a coil spring 21 which restores said diaphragm 26;

a cover 14 with pressure inlet pipe 15.

Reinforcing ribs 28 of this invention are characterized by two intermittent rings (convex-and-concave shaped bumps), while existing reinforcement ribs 25 are of two complete rings. In this invention, as a practical example, there are four (4) dents on the reinforcing rib 28, and it looks like having cruciform groove, but the groove may provided at one place or at many places unless the rigidity decreases.

Possible Commercial Use

Not limited to pressure sensors, it can be used for an application to eliminate the unstable range (non-linear portion) in the relation between pressure and diaphragm displacement, such as being used as a diaphragm for pressure switches, wherein the structure is alike.

EXPLANATION OF THE SYMBOLS

Figure 1:
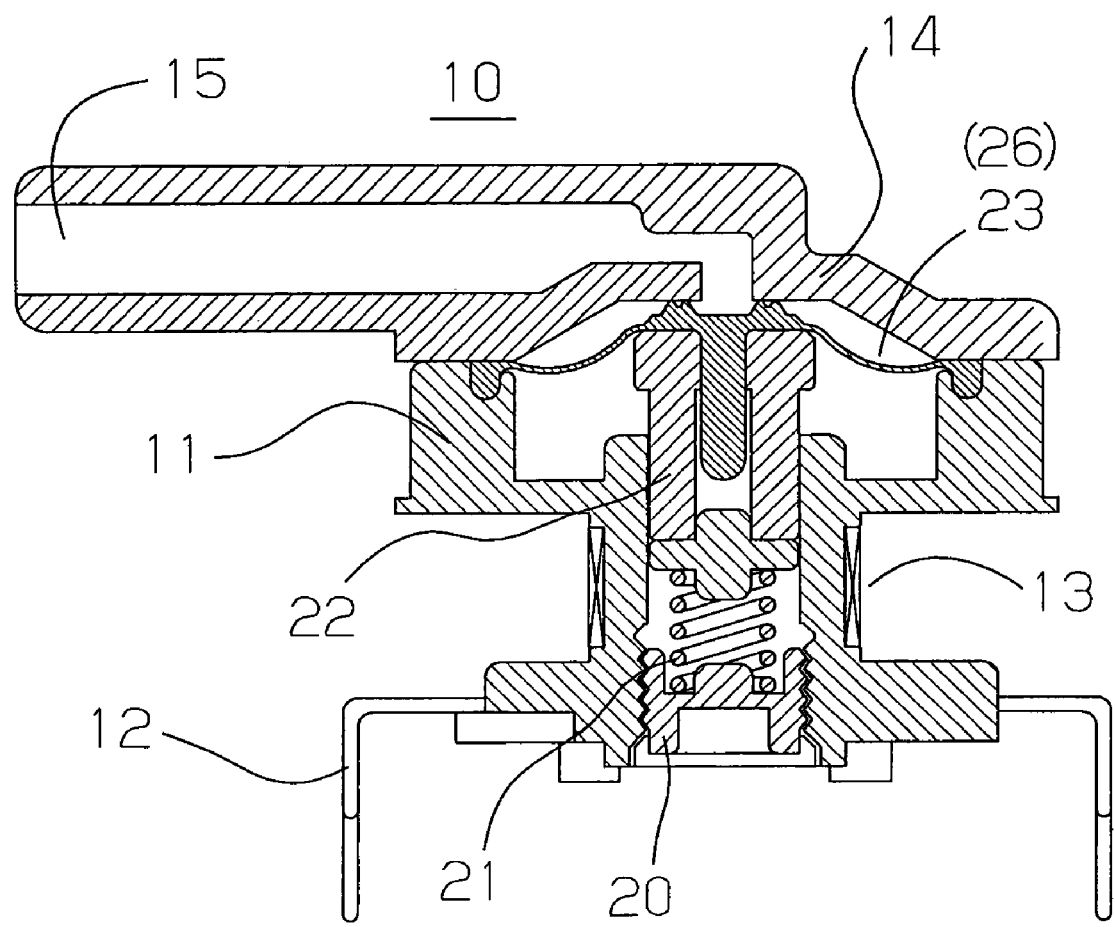
FIG. 1: Cross-section drawing (miniature) of a pressure sensor
Figure 2:
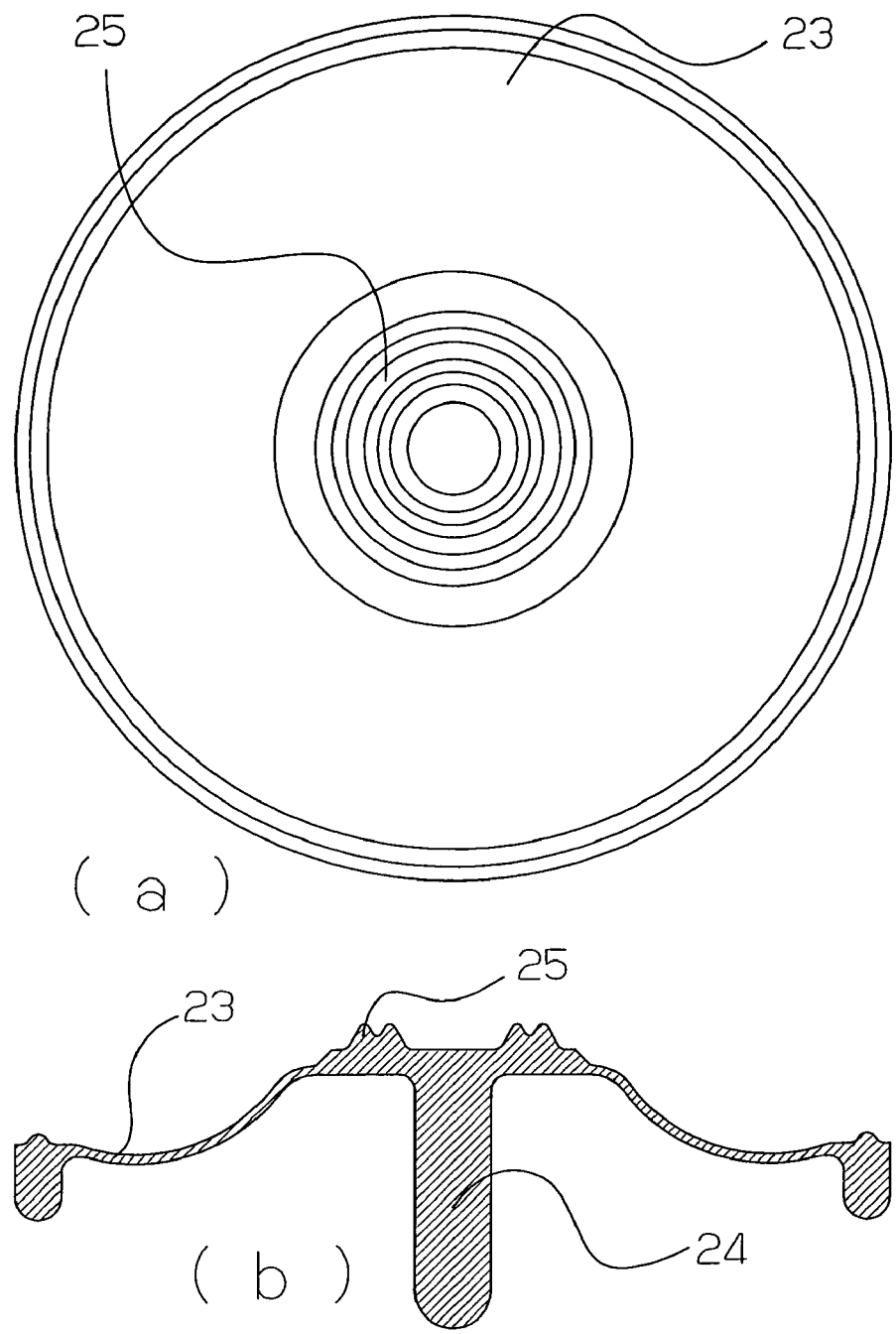
FIG. 2: Plain view and cross-section drawing of a existing diaphragm (Left)
Figure 3:
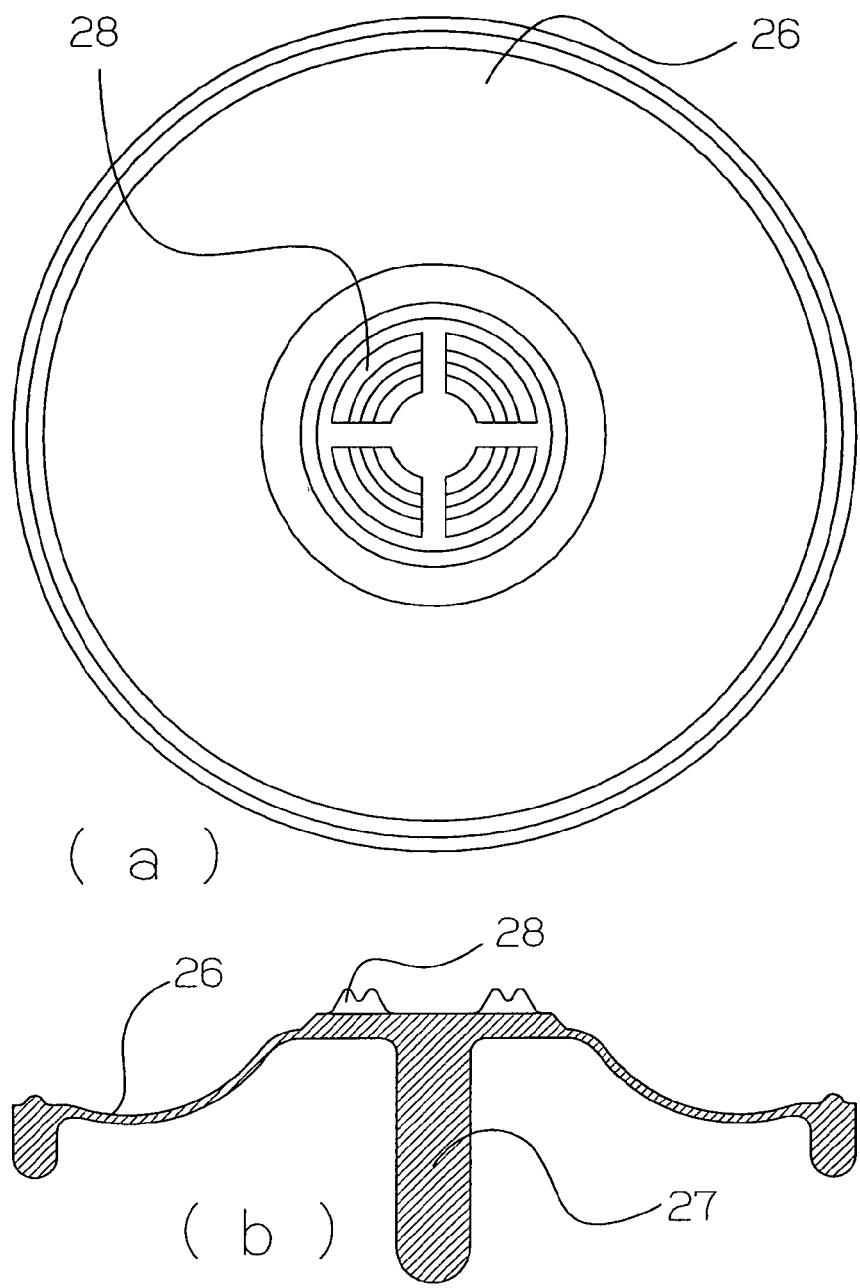
FIG. 3: Plain view and cross-section drawing of a diaphragm of this invention (Right)

10: Pressure sensor, 11: Body, 12: Coil terminal-cum-soldering fixed terminal, 13: Coil, 14: Cover, 15: Pressure inlet pipe, 20: Coil spring adjusting screw, 21: Coil spring, 22; Magnetic body, 23: Existing diaphragm, 24: Support for magnetic body, 25: Existing reinforcing rib, 26: Diaphragm of this invention, 27: Support for magnetic body, 28; Reinforcing rib of this invention

The invention claimed is:

1. A pressure sensor comprising:
   a body, wherein tab terminals for connector connection are insert-molded, or wherein coil terminals-cum-soldering fixed terminals which are inserted into a printed circuit board are insert-molded;
   a coil spring adjusting screw which is screwed into said body;
   a coil which is wound around said body;
   a magnetic body which moves relative to said coil;
   a diaphragm which has a support for said magnetic body projected approximately at the center on one side and has plural intermittent ring-shaped reinforcing ribs by grooves on the other side;
   a coil spring which restores said diaphragm,
   and a cover with pressure inlet pipe.

* * * * *